(12) United States Patent
Minervini et al.

(10) Patent No.: US 8,890,512 B2
(45) Date of Patent: Nov. 18, 2014

(54) VISUAL INDICATOR DEVICE FOR PROXIMITY SENSOR

(75) Inventors: Leo Minervini, Paramus, NJ (US); Kevin Connell, Albertson, NY (US)

(73) Assignee: Pentair Flow Services AG, Schaffhausen (CH)

( * ) Notice: Subject to any disclaimer, the term of this patent is extended or adjusted under 35 U.S.C. 154(b) by 479 days.

(21) Appl. No.: 13/155,826

(22) Filed: Jun. 8, 2011

(65) Prior Publication Data

US 2012/0313625 A1 Dec. 13, 2012

(51) Int. Cl.
*G01B 7/14* (2006.01)

(52) U.S. Cl.
USPC . 324/207.13; 324/173; 324/174; 324/207.11; 324/207.26; 73/514.16; 73/514.31; 73/514.39

(58) Field of Classification Search
USPC ............ 324/173–174, 207.11–207.26; 73/514.16, 514.31, 514.39
See application file for complete search history.

(56) References Cited

U.S. PATENT DOCUMENTS

| 5,591,925 | A  | * | 1/1997  | Garshelis ............... 73/862.335 |
| 6,448,763 | B1 | * | 9/2002  | Spellman ............... 324/207.21 |
| 6,820,647 | B1 | * | 11/2004 | Grecco et al. ............ 137/552 |
| 2002/0137218 | A1 | * | 9/2002  | Mian et al. ............... 436/45 |
| 2005/0069913 | A1 | * | 3/2005  | Mian et al. ............... 435/6 |
| 2006/0272710 | A1 | * | 12/2006 | Minervini et al. ........ 137/487.5 |
| 2011/0025310 | A1 | * | 2/2011  | Moura et al. ............ 324/207.24 |

* cited by examiner

*Primary Examiner* — Huy Q Phan
*Assistant Examiner* — Temilade S Rhodes-Vivour
(74) *Attorney, Agent, or Firm* — Quarles & Brady LLP

(57) ABSTRACT

A device for visually indicating a change in the operational state of a proximity sensor. The device includes a transparent housing having a cavity and a magnet device for generating a magnetic field. In addition, a sleeve is attached to the housing. The magnet device is concealed within the sleeve in a first position to indicate a first operational state. When a target is positioned adjacent the sensor end, magnetic attraction occurs between the target and the magnet device due to the magnetic field to cause movement of the magnet device to a second position within the cavity wherein the magnetic field does not act on the proximity sensor to change the operational state from the first operational state to a second operational state. Further, the magnet device is visible in the second position to indicate the second operational state. The target is attached to a moving element of the valve such as a valve stem such that a change in operational state of the proximity sensor corresponds to a change in operational state of the valve.

20 Claims, 3 Drawing Sheets

:::::::::::::::::::::::::::::::::::::::::::::::::::::::::::::::::::::::::::::::::::::::::::::::::::::

VISUAL INDICATOR DEVICE FOR PROXIMITY SENSOR

FIELD OF THE INVENTION

This invention relates to visual indicator device for a proximity sensor, and more particularly, to a visual indicator device for attachment to a proximity sensor wherein the visual indicator device includes a magnet arrangement which is moveable between a concealed position and a visible position for indicating an operational state of a valve.

BACKGROUND OF THE INVENTION

Many of the processes utilized in various industries, such as those used in the chemical, pharmaceutical and food industries, use valves to control fluid flow. It is desirable to monitor the operational state of a valve, such as whether the valve is opened or closed, to ensure that a particular process or activity is actually being performed. One method for monitoring the operational state of a valve is through the use of a position sensor.

One type of position sensor utilizes a proximity switch to detect whether a valve is opened or closed. The proximity switch utilizes ferromagnetic reed elements having contacts which are activated in the presence of a magnetic field. The proximity switch may be configured such that the contacts are normally open and then close in the presence of a magnetic field so as to complete an electric circuit. Alternatively, the proximity switch is configured such that the contacts are normally closed and are then opened in the presence of a magnetic field. The magnetic field may be provided by a magnet located in a target element.

Referring to FIG. 1, a configuration for monitoring the operational state of a valve utilizing first 10 and second 12 proximity switches is shown. The first 10 and second 12 proximity switches are mounted on a first bracket 14 attached to a portion of a valve 16. First 18 and second 20 target elements are mounted to a second bracket 22 and are spaced apart from the first 10 and second 12 proximity switches. The first 18 and second 20 target elements each include a magnet for actuating the first 10 and second 12 proximity switches, respectively. The second bracket 22 is attached to a moveable portion of the valve 16 such as a knife gate portion of a knife gate valve. The second bracket 22 and the first 18 and second 20 target elements move as shown by the arrows 21 as the knife gate travels between open and closed positions. In FIG. 1, the first target element 18 is shown positioned adjacent to the first proximity switch 10. In this position, a magnetic field of the first target element 18 activates the first proximity switch 10 to thus indicate a first operational state for the valve 16. In use, the knife gate and thus the second bracket 22 move to a position wherein the knife gate valve is either opened or closed. When this occurs, the second target element 20 is positioned adjacent to the second proximity switch 12. In this position, a magnetic field of the second target element 20 activates the second proximity switch 12 to thus indicate a second operational state for the valve 16.

Proximity switches are electrically connected to a control monitor that monitors whether the switch is activated or deactivated. It would be desirable for proximity switches to also provide a visual indication of whether the switch is activated or deactivated.

SUMMARY OF THE INVENTION

A device for visually indicating a change in the operational state of a proximity sensor is disclosed. The device includes a transparent housing having a cavity and a magnet device for generating a magnetic field. In addition, a sleeve is attached to the housing. The magnet device is concealed within the sleeve in a first position to indicate a first operational state. When a target is positioned adjacent the sensor end, magnetic attraction occurs between the target and the magnet device due to the magnetic field to cause movement of the magnet device to a second position within the cavity wherein the magnetic field does not act on the proximity sensor to change the operational state from the first operational state to a second operational state. Further, the magnet device is visible in the second position to indicate the second operational state.

DESCRIPTION OF THE INVENTION

Figure 1:
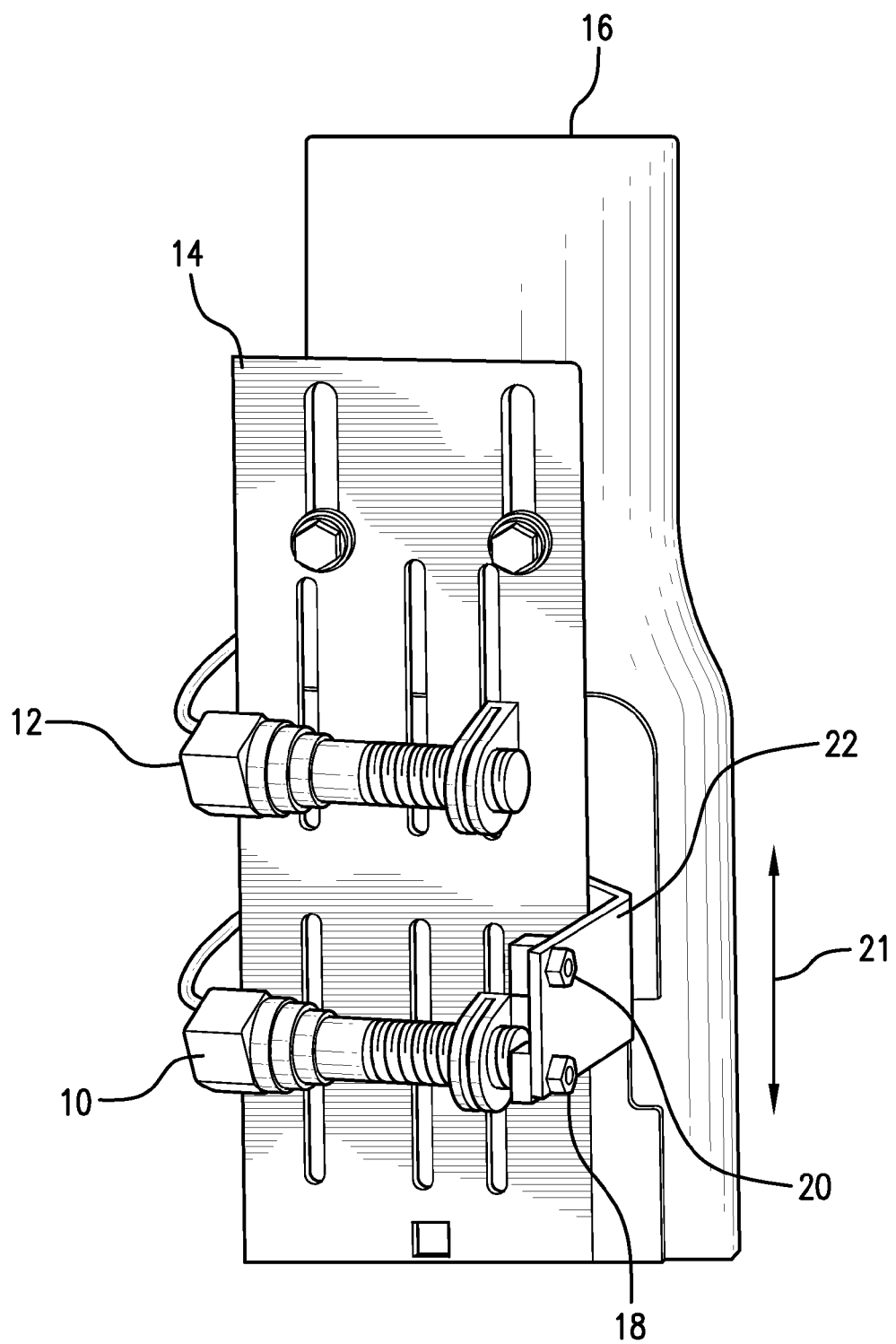
FIG. 1 depicts a proximity switch configuration for monitoring an operational state of a valve.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 2-3.

Figure 2A:
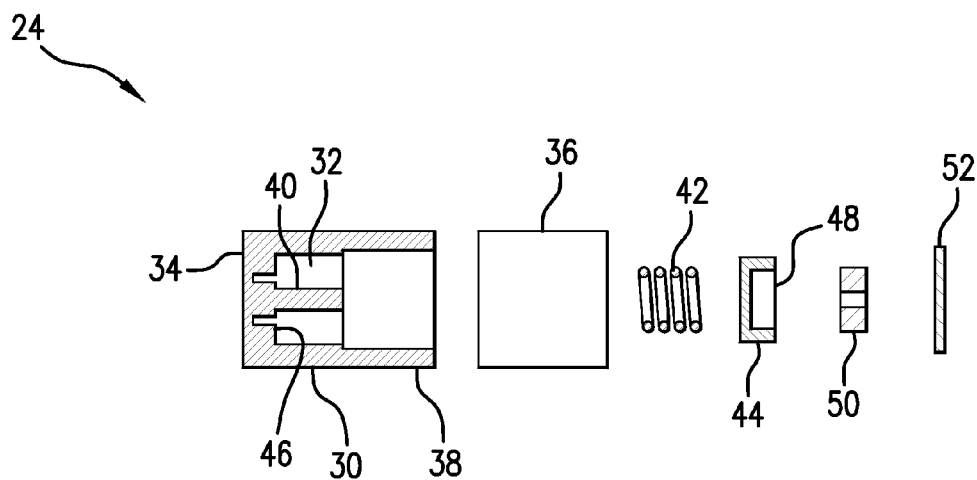
FIGS. 2a-2b illustrate exploded and assembled views, respectively, of a visual indicator device in accordance with the present invention.
Figure 2B:
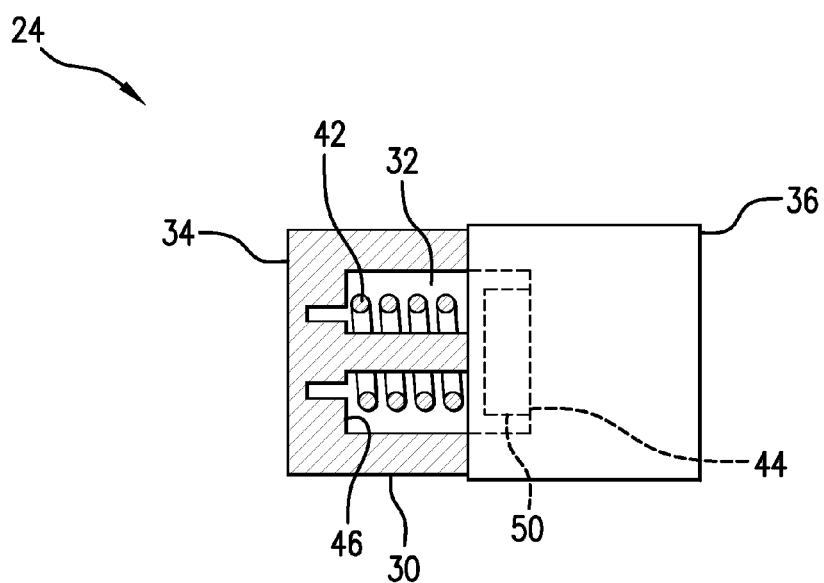

Referring to FIGS. 2a-3, a visual indicator device 24 for use with a proximity sensor 26 and a target 28 is shown. By way of example, the proximity sensor 26 may be a Westlock™ AccuTrak™ 316 Silver Bullet linear position sensor supplied by Tyco Flow Control. Alternatively, the proximity sensor 26 may be any type of proximity sensor that is activated/deactivated by a magnet. Referring to FIGS. 2a-2b, exploded and assembled views, respectively, of the visual indicator device 24 are shown. The visual indicator device 24 includes a housing 30 having a cavity 32 located in a front portion 34 of the housing 30. The housing 30 may be fabricated from a transparent material such as Grilamid® TR transparent polyamide or other suitable transparent material. Thus, the cavity 32 is visible through the transparent material of the housing 30. The visual indicator device 24 also includes a housing sleeve 36 which is affixed to the housing 30 and covers a rear portion 38 of the housing 30. The front portion 34 of the housing 30 is not covered by the housing sleeve 36 and thus the cavity 32 remains visible through the housing 30. The cavity 32 includes a center post 40 for receiving an interior opening of a resilient element such as a compression spring 42. The spring 42 is located between a magnet holder 44 and a housing wall 46. The magnet holder 44 includes an opening 48 for receiving a magnet 50 which generates a magnetic field. The magnet 50 and magnet holder 44 are affixed to the post 40 by a snap ring 52 to thus compress the spring 42 between the magnet holder 44 and the housing wall 46. The magnet 50 and magnet holder 44 are moveable relative to the post 40. Referring to FIG. 2b, the spring 42 urges the magnet 50 and magnet holder 44 (shown as dashed lines) into the housing sleeve 36 into a concealed position wherein the magnet 50 and magnet holder 44 are not visible to an operator.

Figure 3A:
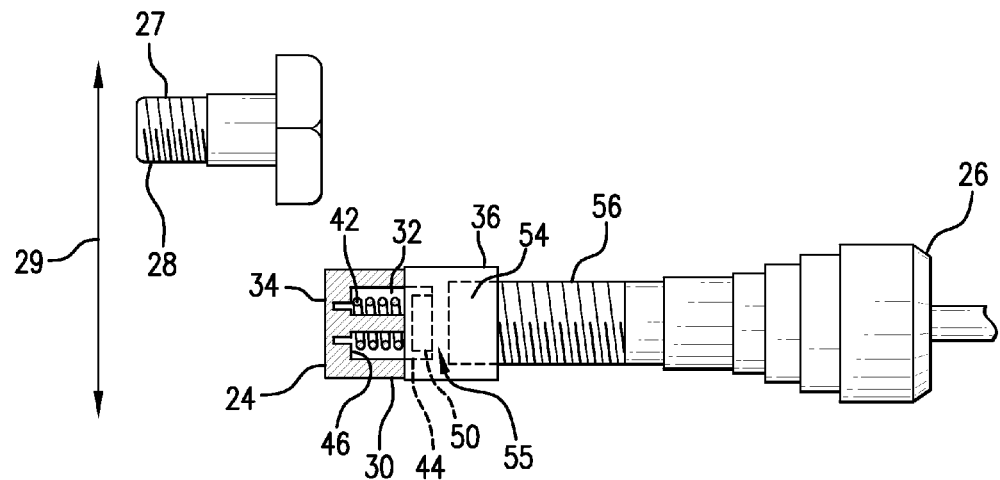
FIGS. 3a-3b illustrate the operation of the visual indicator device in conjunction with a target and a proximity sensor.
Figure 3B:
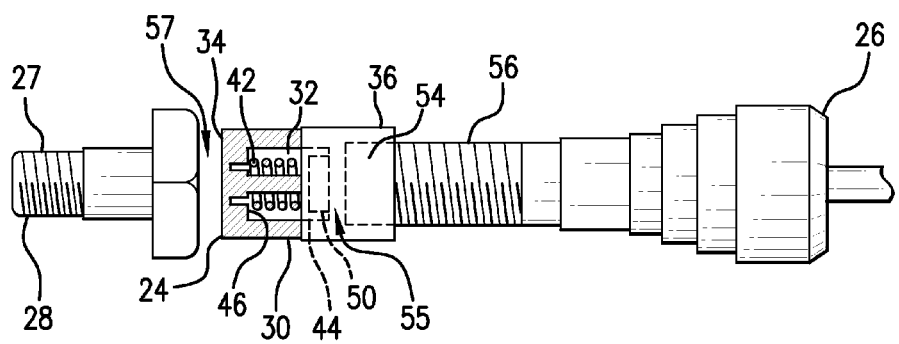

Referring to FIGS. 3a-3b, the visual indicator device 24 is attached to a sensor end 54 (located within housing sleeve 36 and shown as dashed lines) of proximity sensor 26. In accordance with the present invention, the visual indicator device 24 may be attached as an add-on accessory to any existing proximity sensor currently available or actually being used in industry so to provide a visual indication of whether the proximity sensor is activated or deactivated and the operational state of a valve. The visual indicator device 24 may be attached to the sensor end 54 by any conventional means such as a friction fitting, snap fitting, set screws, adhesive and others. In one embodiment, the housing sleeve 36 includes an internal thread which is adapted to mate with an external thread 56 formed on the sensor end 54 of proximity sensor 26.

The visual indicator device 24 operates in conjunction with the target 28 to either activate or deactivate the proximity sensor 26. In accordance with the present invention, the target 28 is fabricated from a ferrous material and may be configured as a hex head bolt having an external bolt thread 27. The target 28 does not include a magnet. The target 28 is attached to a mounting bracket or other device secured to a moveable portion of a valve such as a valve stem. The target 28 moves with the valve stem as the valve stem travels between open and closed positions which correspond to first and second operational states, respectively, for the valve. Alternatively, the open and closed positions correspond to second and first operational states, respectively, for the valve. The valve may be any type of valve which is used in conjunction with a proximity sensor such as a knife gate valve, plug valve or a globe valve. In one embodiment, the target 28 is threaded into the mounting bracket to enable adjustment of a target gap 57 between the target 28 and the magnet 50.

Referring to FIG. 3a, the magnet 50 and magnet holder 44 (located within housing sleeve 36 and shown as dashed lines) are in the concealed position as previously described in relation to FIG. 2b. In the concealed position, the magnet 50 is separated from the sensor end 54 by an end gap 55. The magnet 50 is located sufficiently close to the sensor end 54 such that the magnetic field of the magnet 50 activates the proximity sensor 26. Thus, placement of the magnet 50 and magnet holder 44 in the concealed position wherein the magnet 50 and magnet holder 44 are not visible indicates to an operator that the proximity sensor 26 is activated thus indicating a first operational state for the valve. In one embodiment, the proximity sensor 26 is activated when the end gap 55 between the magnet 50 and the sensor end 54 is approximately 0.100 in. Alternatively, stronger magnets may be used which enables the use of correspondingly larger end gaps such as approximately 0.500 in., for example. In FIG. 3a, the target 28 is spaced a sufficient distance from the magnet 50 such that the magnetic field has no effect on the target 28.

Referring to FIG. 3b, movement of the valve to a second operational state moves the target 28 (see arrow 29) such that it is located adjacent the visual indicator device 24. In this position, the target 28 is sufficiently close to the visual indicator device 24 such that magnetic attraction occurs between the target 28 and the magnet 50. The magnetic attraction compresses the spring 42 and causes movement of the magnet 50 and magnet holder 44 away from the sensor end 54 and toward the target 28 such that the magnetic field does not act on the proximity sensor 26 and the proximity sensor 26 is deactivated. The magnetic attraction also causes the magnet 50 and magnet holder 44 to move from within the housing sleeve 36 and into the cavity 32 to a visible position wherein the magnet 50 and magnet holder 44 are visible through the transparent housing 30. In the visible position, the magnet 50 and magnet holder 44 are visible to an operator to thus indicate that the proximity sensor 26 is deactivated and that the valve is in the second operational state. In one embodiment, the magnet holder 44 has visual indicia to increase visibility to the operator. The visual indicia may include, for example, a color which provides suitable contrast with the surrounding area. In one embodiment, the magnet holder is yellow. Alternatively, a combination of colors or symbols may be used.

When the valve movement causes the target 28 to be located away from the sensor end 54 as described in relation to FIG. 3a, the spring 42 urges the magnet 50 and magnet holder 44 back to the concealed position to thus indicate to the operator that the proximity sensor 26 is activated. Alternatively, the proximity sensor 26 may be configured such that it is deactivated when the magnet 50 and magnet holder 44 are in the concealed position and activated when the magnet 50 and magnet holder 44 are in the visible position. In another embodiment, the housing 30 may be fabricated from stainless steel in order to provide increased durability.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A device for indicating an operational state of a proximity sensor having a sensor end, comprising:
   a transparent housing having a cavity;
   a magnet device for generating a magnetic field;
   a sleeve attached to the housing,
      wherein the magnet device is concealed within the sleeve in a first position to indicate a first operational state wherein when a target is positioned adjacent the sensor end,
      magnetic attraction occurs between the target and the magnet device due to the magnetic field to cause movement of the magnet device to a second position within the cavity
      wherein the magnetic field does not act on the proximity sensor to change the operational state from the first operational state to a second operational state and
      wherein the magnet device is visible in the second position to indicate the second operational state.

2. The device according to claim 1, wherein the target is located approximately 0.100 in. from the sensor end.

3. The device according to claim 1, further including a spring compressed between a wall of the housing and the magnet device for urging the magnet device into the first position.

4. The device according to claim 1, wherein the magnet device includes a magnet holder for holding a magnet for generating the magnetic field.

5. The device according to claim 1, wherein the magnet device is yellow.

6. The device according to claim 1, wherein the target is fabricated from a ferrous material.

7. A device for indicating an operational state of a valve having a moveable valve portion, wherein the valve changes from a first operational state to a second operational state, comprising:
- a transparent housing having a cavity;
- a magnet device for generating a magnetic field;
- a sleeve attached to the housing wherein the magnet device is concealed within the sleeve in a first position to indicate the first operational state;
- a proximity sensor having a sensor end; and
- a target attached to the valve portion
    - wherein when the target is positioned adjacent the sensor end, the valve is in the second operational state and magnetic attraction occurs between the target and the magnet device due to the magnetic field to cause movement of the magnet device to a second position within the cavity
    - wherein the magnetic field does not act on the proximity sensor to cause the proximity sensor to indicate that the valve is in the second operational state and
    - wherein the magnet device is visible to indicate the second operational state.

8. The device according to claim 7, wherein the target is located approximately 0.100 in. from the sensor end.

9. The device according to claim 7, further including a spring compressed between a wall of the housing and the magnet device for urging the magnet device into the first position.

10. The device according to claim 7, wherein the magnet device includes a magnet holder for holding a magnet for generating the magnetic field.

11. The device according to claim 7, wherein the magnet device is yellow.

12. The device according to claim 7, wherein the target is fabricated from a ferrous material.

13. The device according to claim 7, wherein the valve is a knife gate valve.

14. A device for changing an operational state of a proximity sensor having a sensor end, comprising:
- a housing having a cavity;
- a magnet device for generating a magnetic field;
- a sleeve attached to the housing,
    - wherein the magnet device is located within the sleeve in a first position wherein the magnetic field acts on the proximity sensor to place the proximity sensor in a first operational state;
    - a target positioned adjacent the sensor end, wherein magnetic attraction occurs between the target and the magnet device due to the magnetic field to cause movement of the magnet device to a second position within the cavity
    - wherein the magnetic field does not act on the proximity sensor to place the proximity sensor in a second operational state.

15. The device according to claim 14, wherein the target is located approximately 0.100 in. from the sensor end.

16. The device according to claim 14, further including a spring compressed between a wall of the housing and the magnet device for urging the magnet device into the first position.

17. The device according to claim 14, wherein the magnet device includes a magnet holder for holding a magnet for generating the magnetic field.

18. The device according to claim 14, wherein the magnet device is yellow.

19. The device according to claim 14, wherein the target is fabricated from a ferrous material.

20. The device according to claim 14, wherein the housing is fabricated from stainless steel.

* * * * *